May 23, 1933.  F. HAMMOND  1,910,332
METALLIC TIRE COVER
Filed March 19, 1930  3 Sheets-Sheet 1
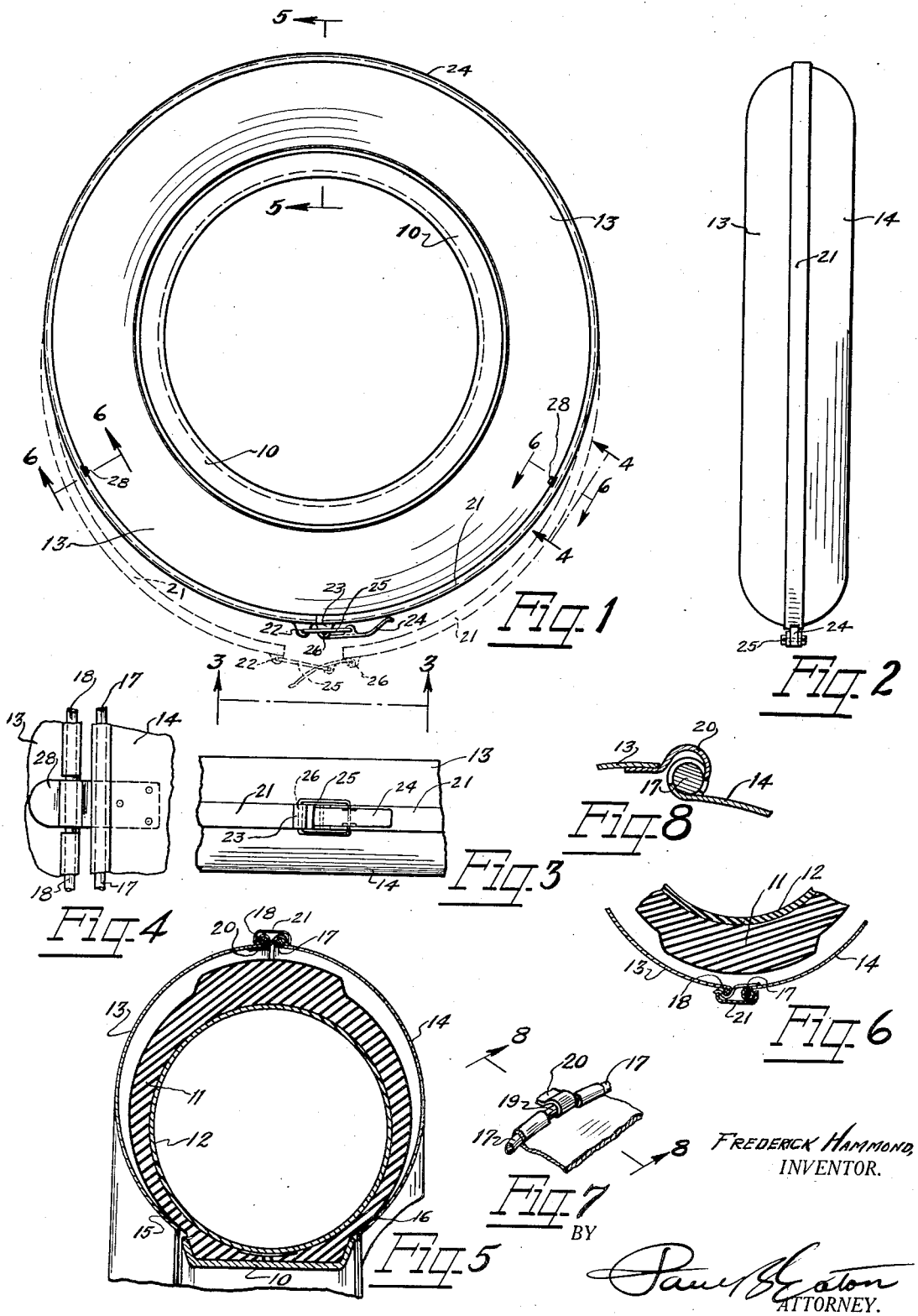
FREDERICK HAMMOND,
INVENTOR.
BY
ATTORNEY.

May 23, 1933.   F. HAMMOND   1,910,332
METALLIC TIRE COVER
Filed March 19, 1930   3 Sheets-Sheet 2
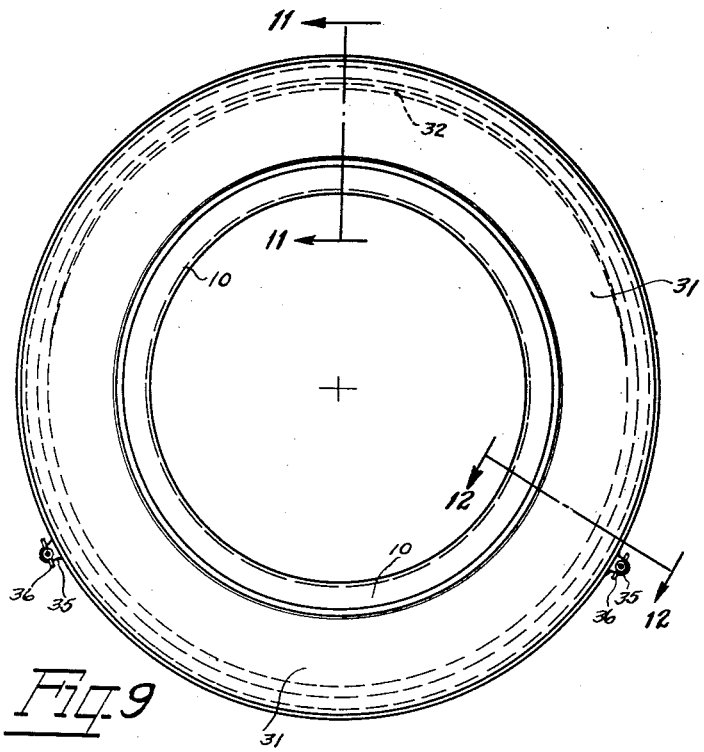
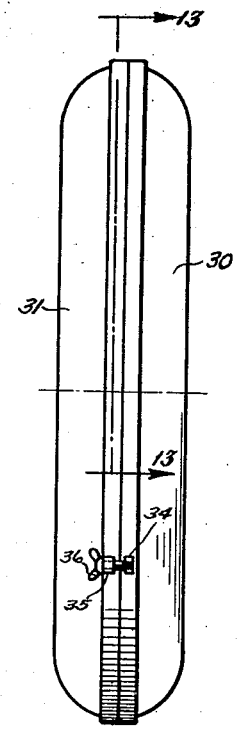
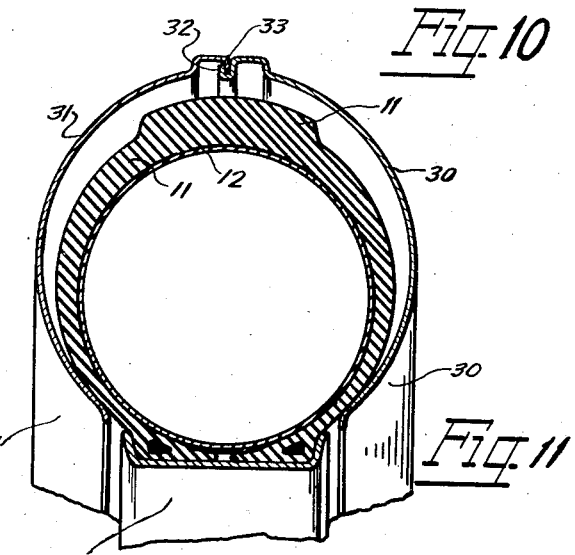
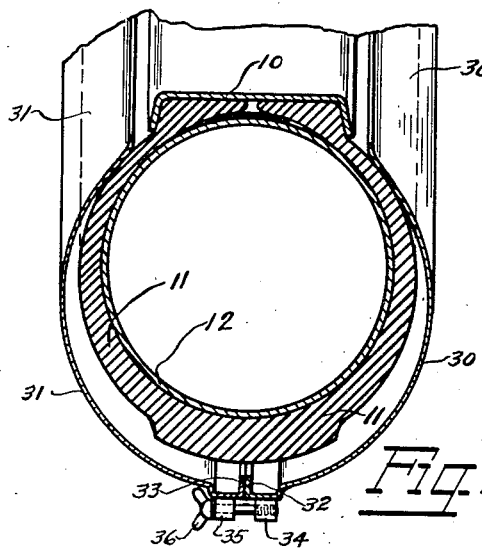
FREDERICK HAMMOND,
INVENTOR.
BY
ATTORNEY.

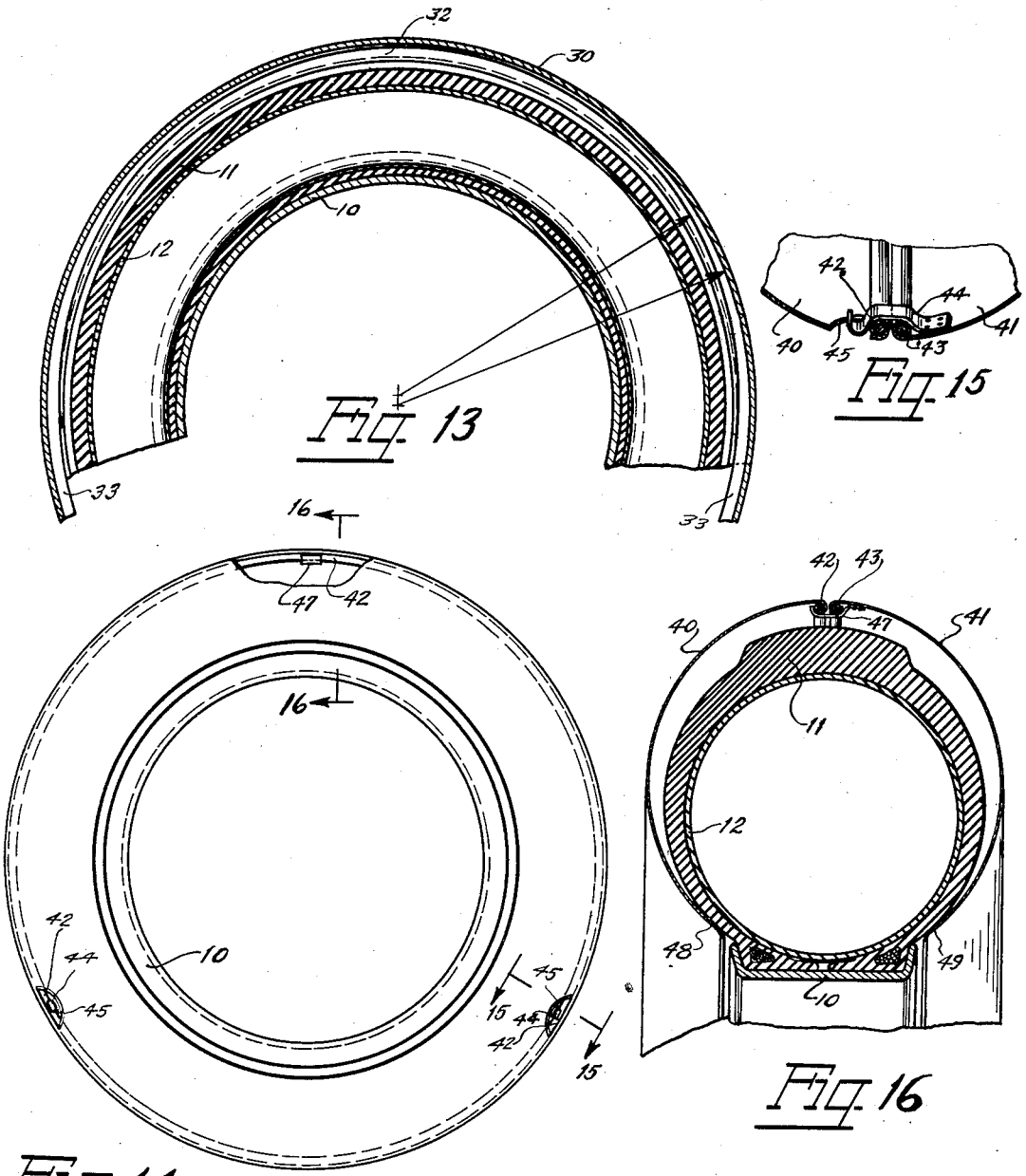

Patented May 23, 1933

1,910,332

REISSUED

UNITED STATES PATENT OFFICE

FREDERICK HAMMOND, OF CHARLOTTE, NORTH CAROLINA

METALLIC TIRE COVER

Application filed March 19, 1930. Serial No. 437,098.

This invention relates to a tire cover and more especially to a tire cover made of metal, or any other permanent material, an object being to provide a tire cover which can be painted to harmonize with the other portions of the automobile, a tire cover which will protect the tire from the elements and will not deteriorate from use, which will not become wrinkled, which will enhance the appearance of the car, which will not crack and become torn as is now the case with many tire covers in use.

Another object of my invention is to provide a metallic tire cover made in sections which can be easily applied and removed, which will fully protect the spare tire over which this cover is placed, and due to the fact of a narrow space being between the cover and the tire will protect the tire from the heat of the sun.

Another object of my invention is to provide a metallic tire cover having the inside periphery thereof to resiliently engage the sides of the tire to form a cover which will exclude moisture and provide insulation for the tire on account of there being an air space between the cover and the tire.

Another object of my invention is to provide a metallic tire cover which being of metal will permit the trade-mark of the car to be impressed thereon in a permanent manner which will add to the appearance of the car and will allow the emblem or trade-mark of a car to be affixed in a permanent manner, whereas in fibrous and other tire covers which are now in use this has not been practical on account of the cracking of the tire cover and the wrinkling thereof from constant use.
Some of the objects of my invention having been stated other objects will appear as the description proceeds, when taken in connection with the accompanying drawings, in which—
Figure 1 is a side elevation of my tire cover showing the same applied to a spare tire and rim;

Figure 2 is an edge view of Figure 1;
Figure 3 is a bottom plan view of a portion of Figure 1 taken along the line 3—3 in Figure 1;

Figure 4 is a detail view taken along the line 4—4 in Figure 1;

Figure 5 is a cross-sectional view taken along the line 5—5 in Figure 1;

Figure 6 is a cross-sectional, detail view taken along the line 6—6 in Figure 1;

Figure 7 is a detail view showing the manner of fastening the two sections of the tire cover together around the tire;

Figure 8 is a cross-sectional view taken along the line 8—8 in Figure 7;

Figure 9 is a side elevation of a modified form of my tire cover;

Figure 10 is an edge view of Figure 9;

Figure 11 is a cross-sectional view taken along the line 11—11 in Figure 9;

Figure 12 is a cross-sectional view taken along the line 12—12 in Figure 9;

Figure 13 is a modified form of fastening the two parts of the tire cover together;

Figure 14 is a side view of still another modified form of my invention;

Figure 15 is a cross-sectional view taken along the line 15—15 in Figure 14;

Figure 16 is a cross-sectional view taken along the line 16—16 in Figure 14.

Referring more specifically to the drawings in Figures 1 to 8 inclusive the numeral 10 indicates the rim portion on which a tire 11 is mounted with an inner tube 12 therein, these parts being conventional, and it is the purpose of my invention to provide a tire cover for the tire casing 11. This tire cover comprises the sections 13 and 14 with the points 15 and 16 pressing against the side walls of the tire to form a tight fit, and the portion 14 has the wire 17 around the periphery thereof with the portion 14 being rolled around this wire. The portion 13 has a similar wire 18 around the periphery thereof with the portion 13 being rolled around this wire. At intervals around the periphery of the portion 14 there are cut away places 19 and hooks 20 are secured to the portion 13 which are adapted to hook over the wire 18 to fasten the two parts 13 and 14 together.

In order to firmly secure the parts 13 and

14 together I provide the ring portion 21 which has the lug 22 integral therewith at one end thereof and the lug 23 is integral with the other end of this member 21. Pivotally mounted in the portion 23 is the lever 24 which has pivotally mounted therein the link 25 and this link is also pivotally mounted in the lug 22. This lever 24 is pivotally mounted in the lug 23 as at 26, so as to firmly secure the strip 21 around the periphery of the two members 13 and 14 to firmly secure the same together and also to form a water-tight joint at the junction point of the two members.

The fastening shown in Figure 8 and which has just been described occurs at the top of the tire casing while on the lower portion of each side thereof spring clips 28 are secured which hook over the wire 18, these spring clips being secured to the portion 14 so as to secure the two parts together and by placing the finger or an instrument beneath the portion 28 and prying it up, the portions 13 and 14 can be separated.

In Figures 9 to 13 inclusive I have shown another modified form of my invention, in which the two parts of the tire cover are indicated by the reference characters 30 and 31, and in this form of the invention the strip 21 is dispensed with and instead of this fastening means I provide the up-turned portion 32 at the top portion of the member 30 which forms a groove into which the in-turned flange 33 fits. This in-turned flange 33 on the member 31 extends all the way around member 31, but the flange 32 diminishes in depth until it reaches about the half-way portion down in looking at Figure 13, at which point it entirely disappears, and in Figure 12 it will be seen that the flanges 32 and 33 are similar as the groove had disappeared by the up-turned portion 32 being diminished to a point where it no longer exists. This provides a groove in the upper half of the portion 30 into which the in-turned flange 33 may project to hold the two parts in position. Near the lower portion of both sections of members 30 and 31 suitable lugs 34 and 35 project, and a bolt 36 is loosely mounted in the projection 35 and is adapted to threadably engage projection 34 to secure the two parts of the tire cover together.

It is seen that the flange 32 at the top portion of member 30 holds the top portions together and the bolts which have been described in cooperation with the lugs to hold the bottom portions together, so that when it is desired to remove the tire cover from the tire the bolts 36 are loosened and the portion 31 is raised outwardly at the bottom and then upwardly, and is removed from the tire and the other portion 30 falls out from the tire which makes it a very easy tire cover to remove.

In Figures 14 and 15 and 16 I have shown a slightly modified form of my invention, in which the rim 10, casing 11 and the inner tube 12 are conventional as in the other views, but here I have the sections 40 and 41 forming the tire cover with the section 40 having the wire 42 around the edge thereof with the portion 40 being curled around this wire, and the portion 41 has the wire 43 similarly attached to member 41. On the inside of member 41 is secured a spring clip 44 which is adapted to resiliently engage the curled portion of 40 which goes around wire 42 to hold the two parts together.

The portion 40 has holes 45 therein through which an instrument can be inserted to remove the spring pressed member 44 from engagement with the curled portion surrounding the wire 42 to separate the two parts of the tire cover. At the top the simple spring hook 47 is provided but no hole is at the top of the tire cover for disengagement of 47 from the curled portion surrounding the wire 42, as it is evident that when the two lower clips which are shown in Figure 15 are removed that the top portion will not hold the two parts together because one part can be raised off the tire with relation to the other part.

In all forms of this invention it is evident that the inner portions which are shown in Figure 16 as at 48 and 49 closely fit against the side wall of the casing and fit down in close proximity to the rim of the tire, so as to provide an absolutely tight closure for the tire. It is intended that these portions of the tire cover do not engage the rim because this would cause rattling, but are to stop short of the rim and to firmly press against the casing of the tire in a resilient manner, although if it should be desired to so make the cover to press against the rim to hold the tire cover away from the casing to form an air space between the casing and the cover it can be done.

It will be noticed in all of the views that there is an air space between the cover and the casing which forms a shield for the casing from the heat of the sun as it shines upon the tire cover. In all tire covers heretofore used it has been the purpose to have the tire cover closely fit against the casing and in this way heat was transmitted directly through the cover to the casing, but in my tire cover it is an object of the invention to form an air pocket between the cover and the casing to protect the casing from the heat of the sun.

In the drawings and specification I have set forth a preferred embodiment of my invention, and although specific terms are employed, they are used in a generic and descriptive sense only, and not for purposes of limitation, the scope of the invention being set forth in the appended claims.

I claim:

1. In a metallic tire cover, two circular members, each of said members being approximately semi-circular in cross section, one of said members having an outwardly opening groove along a portion of its outer periphery, the other of said members having an inwardly projecting tongue adapted to fit into said groove, and coinciding lugs on the outer periphery of said members for securing the members together.

2. In a tire cover for spare tires of automobiles and the like, two circular members, each member being approximately semi-circular in cross-section, one of said members when placed on a spare tire having on its upper half, an outwardly opening groove diminishing in depth, the other member having an inturned flange adapted to fit into said groove, both of said portions having on the lower half thereof and on the outer periphery thereof coinciding projections, and means for securing said projections together.

In testimony whereof I affix my signature.

FREDERICK HAMMOND.